Sept. 27, 1938.　　　　G. L. DIMMICK　　　　2,131,501
SOUND RECORD PRINTING
Filed Jan. 19, 1935
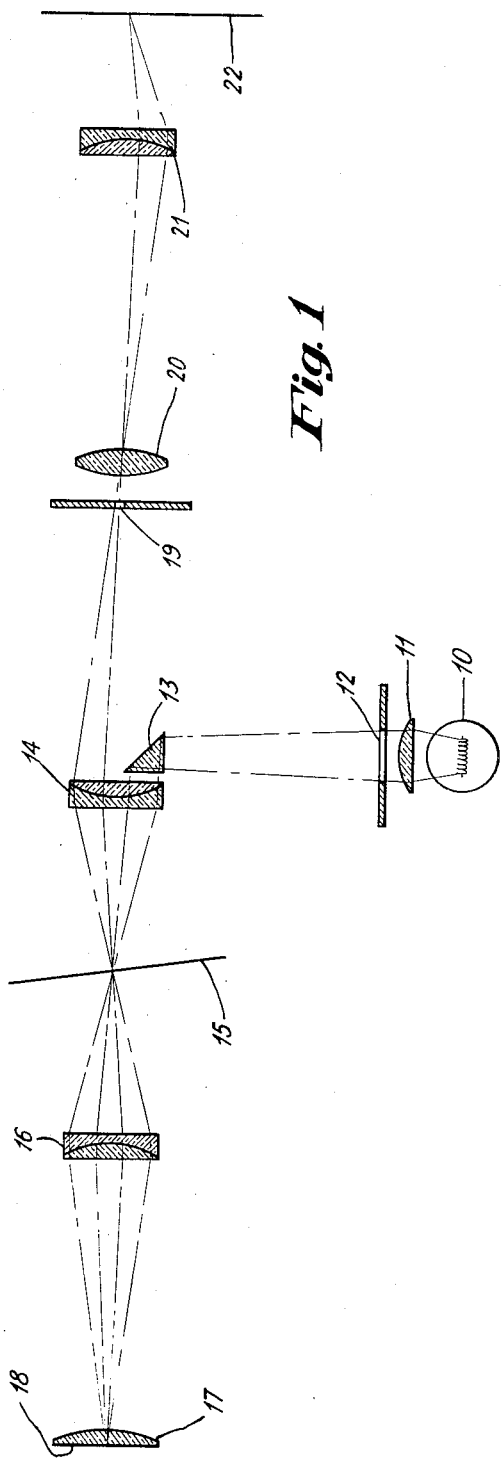
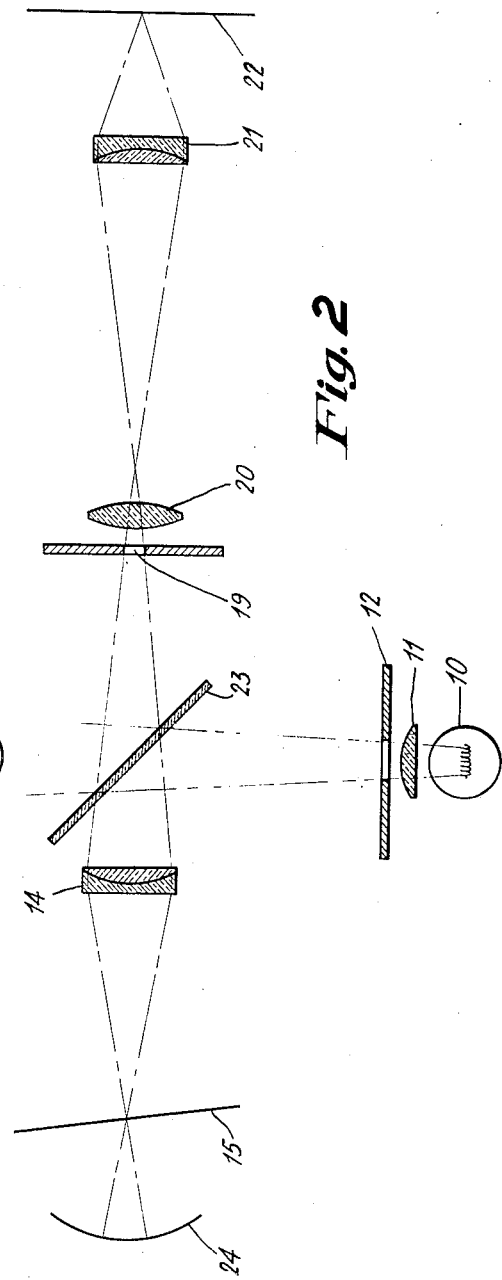
INVENTOR
GLENN L. DIMMICK
BY
ATTORNEY Patented Sept. 27, 1938

2,131,501

UNITED STATES PATENT OFFICE 2,131,501

SOUND RECORD PRINTING

Glenn L. Dimmick, Haddonfield, N. J., assignor to Radio Corporation of America, a corporation of Delaware Application January 19, 1935, Serial No. 2,459

4 Claims. (Cl. 88—24)

This invention relates to the printing of sound records, has for its principal object the provision of an improved apparatus and method of operation for minimizing or obviating distortion of the recorded sound particularly in the higher frequency ranges.

The development of better photographic film and the improvements in optical systems have made it possible to record sound with greatly reduced losses or distortion in the higher frequency ranges. Sound reproduced directly from the sound record negative shows comparatively little distortion of the high frequency components. When a contact print of the negative is made, however, great loss of the high frequency components results and sound reproduced from the positive print is correspondingly distorted.

This distortion of the printed positive sound record results from the fact that the peaks of the negative must be dense or opaque if fogging of the valleys of the positive print are to be kept clear and from the further fact that making the negative peaks dense enough to avoid fogging the positive valleys of the print produces fogging of the negative valleys. Otherwise stated, when the peaks of the negative are dense enough so that not enough light is transmitted through the negative to fog the clear valleys of the positive, the valleys of the negative are badly fogged and the print or positive is still defective in that its valleys are fogged. This limitation in the ability of the present photographic film to resolve on to the positive print a true replica of the negative therefore has prevented the production of sound records having a minimum of distortion.

In accordance with the present invention, this difficulty is avoided by making a sound record negative which is comparatively thin or less dense than normal and subjecting the positive to a printing light beam which has been repeatedly transmitted through the comparatively thin negative sound record. There are thus produced on the positive print superposed sound track images which form a resulting image not fogged in the valleys and sufficiently dense at the peaks to prevent fogging of the positive valleys. The density of the sound negative may, of course, depend somewhat on the number of times the printing light beam is passed through it. For example, if two passes of the beam are made, the density of the negative film may be of the order of 0.8 instead of the usual 1.6.

The invention will be better understood from the following description when considered in connection with the accompanying drawing and its scope will be pointed out in the appended claims.

Referring to the drawing:

Fig. 1 is a diagrammatic illustration of a printer embodying the preferred form of the invention, and Fig. 2 is a similar illustration of a modification.

The printing apparatus of Fig. 1 includes a source 10 from which light is transmitted through a condenser lens 11 and a rectangular aperture 12 to a prism 13. An image of the aperture 12 is reflected by the prism 13 through the lower half of a corrected lens 14, a negative sound record 15 and the lower half of a lens 16 to a lens 17. The lens 17 is silvered at 18 and reflects a sound track image back through the upper half of lens 16, the negative sound record 16, the upper half of corrected lens 14, light slit 19, lens 2 and corrected lens 21 to positive 22.

As will be readily understood, two images of the positive sound track are thus superposed on the positive 22 and the density of the resultant printing image is correspondingly increased without fogging the negative valleys.

It should be noted that the negative sound record 15 may be placed at an angle to the optical axis, as illustrated, to prevent specular reflection from the film.

The modification of Fig. 2 is similar in many respects to that of Fig. 1 but differs therefrom in that the prism 13 of Fig. 1 is replaced by a half silvered mirror which reflects and transmits equally. Part of the light is reflected through lens 14 and negative sound record 15 to a silvered spherical reflector 24. From this reflector light is reflected and transmitted back through negative 15, lens 14, the mirror 23 and otherwise to the positive 22 as explained in connection with Fig. 1.

Having thus described my invention, I claim:

1. The method of producing a photographic record which includes making a negative with a density reduced to a predetermined value, and applying to a positive print superposed negative images of a number proportional to the reduction of said density.

2. The method of making a photographic print which includes passing light through a negative image, forming a real image of said negative image in coincidence therewith, and exposing a photographic emulsion to the light from said real image transmitted by said negative.

3. Photographic printing means comprising means for passing light through a negative image, means for directing the light transmitted back to said negative, means for forming a real image of said negative in coincidence with said negative image, and means for focusing light transmitted by said negative upon a photographic emulsion.

4. The method of producing a photographic record which includes making a negative image with a density reduced to a predetermined value, passing light through said negative image a number of times proportional to said reduction for forming real images in coincidence with said negative image, and passing the light finally transmitted by said negative to a photographically sensitive emulsion.

GLENN L. DIMMICK.